United States Patent
Okkonen et al.

(10) Patent No.: US 8,045,971 B2
(45) Date of Patent: Oct. 25, 2011

(54) COMMUNICATIONS NETWORK CAPABLE OF DETERMINING SIM CARD CHANGES IN ELECTRONIC DEVICES

(75) Inventors: Harri Okkonen, Dana Point, CA (US); Bindu Rama Rao, Laguna Niguel, CA (US); Ziaul Jami Huq, Rancho Santa Margarita, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1099 days.

(21) Appl. No.: 11/650,777

(22) Filed: Jan. 8, 2007
(Under 37 CFR 1.47)

(65) Prior Publication Data
US 2007/0184823 A1    Aug. 9, 2007

Related U.S. Application Data

(63) Continuation of application No. 10/417,285, filed on Apr. 15, 2003, now Pat. No. 7,369,851.

(60) Provisional application No. 60/386,199, filed on Apr. 19, 2002.

(51) Int. Cl.
*H04M 3/00*    (2006.01)

(52) U.S. Cl. .......... 455/419; 455/418; 455/420
(58) Field of Classification Search .......... 455/418, 455/419, 420
See application file for complete search history.

(56) References Cited

U.S. PATENT DOCUMENTS

| | | | | |
|---|---|---|---|---|
| 6,052,600 | A | * | 4/2000 | Fette et al. ............. 455/509 |
| 6,148,192 | A | * | 11/2000 | Ahvenainen ............ 455/410 |
| 2003/0195951 | A1 | * | 10/2003 | Wittel et al. ............ 709/220 |
| 2005/0084079 | A1 | * | 4/2005 | Lang .................. 379/88.18 |

* cited by examiner

*Primary Examiner* — Michael Thier
*Assistant Examiner* — Justin Lee

(57) ABSTRACT

A communication network comprising a carrier network with a service coordinator is capable of acting upon SIM card change information detected by an agent located in the electronic devices used in the communication network. In general, the agent in electronic devices facilitates the determination of SIM Card changes in the electronic device. It also facilitates the selective reporting of such changes to the carrier network. In one embodiment, the communication network is capable of detecting SIM Card changes in the electronic device. In general, the carrier network determines updates to firmware, software, configuration etc. necessitated by the change in SIM card and selectively communicates it to the electronic device.

28 Claims, 5 Drawing Sheets

US 8,045,971 B2

COMMUNICATIONS NETWORK CAPABLE OF DETERMINING SIM CARD CHANGES IN ELECTRONIC DEVICES

RELATED APPLICATIONS

This application is a continuation of U.S. patent application Ser. No. 10/417,285 entitled "Communications Network Capable Of Determining SIM Card Changes In Electronic Devices", filed Apr. 15, 2003 now U.S. Pat. No. 7,369,851, which makes reference to, claims priority to and claims the benefit of U.S. Provisional Patent Application Ser. No. 60/386,199, entitled "Communications Network Capable Of Determining SIM Card Changes In Electronic Devices", filed Apr. 19, 2002, the complete subject matter each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. Electronic devices, such as GSM phones, often contain a SIM card reader that is employed to read information on SIM cards that are inserted by end users. SIM cards are expected to provide personal identity regardless of phone. The firmware and application software on such electronic devices often employ information contained in a SIM card to avail of services provided by service providers over the telecommunications network Quite often, SIM cards are used to specify the identification of the end user such that any device into which the SIM card is inserted assumes the identity provided by the SIM card. Services accessed by the end user using a SIM card in conjunction with an electronic device are often tailored by the service provider based on information provided by/from the SIM card. This approach has several inherent problems. For example, if the service provider provides content or service based on information provided by the SIM card, such content or information may not be compatible with the electronic device that currently holds the SIM card.

Typically, electronic devices that are handsets, such as GSM phones, PDA's etc. provide SIM card readers. In such devices, a service provider for services accessed from the handset does not know what the actual device type is that is being serviced. Only information provided by the SIM card in the handset is available to the service provider to determine the type of service or type of information to be provided to the end user. If the end user reuses the SIM card in another electronic device and accesses the service, the service provider does not know, and often cannot determine, that the electronic device has been changed. This is especially true of GSM phones where a wireless carrier does not know which wireless handsets type or make is associated with a given SIM card employed by a end user and therefore cannot easily determine the software or firmware that is available in the handset.

There is often a need to know which specific end user electronic device is associated with a end user's SIM card. There is also a need to determine the make, model and version of hardware and software available on the electronic device associated with a SIM card. Unfortunately, such information is not available to the service provider, only the contents of the SIM card, such as a user identification is provided to the service provider. This is a major problem that currently inhibits creation of new services for electronic handsets.

Quite often, new versions of the firmware and software are periodically released to fix the bugs or to introduce new features, or both. There is a fundamental problem in determining which electronic device needs the bug fixes if the service provider or the carrier is not able to accurately and reliably determine which electronic device is currently associated with a given SIM card.

Typically, attempts to upgrade firmware and/or software in electronic devices such as GSM phones are often hampered by limited user interaction capabilities and slow communication speeds on these devices and end user interactions cannot be resorted to, as they can be erroneous. Automating firmware and/or software upgrades, within a carrier network for example, requires the reliable determination of the actual device characteristics associated with a SIM card. When a SIM card is transferred from one electronic device to another, the service provider or the carrier needs to determine what changed. Unfortunately, determination of the change of SIM cards is not supported in most electronic devices and service providers and carriers are totally ignorant of such changes.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A device and system supporting provision of services to a subscriber through the detection of changes of user interchangeable programmed cards, substantially as shown in and/or described in connection with at least one of the figures, as set forth more completely in the claims.

These and other advantages and novel features of the present invention, as well as details of an illustrated embodiment thereof will be more fully understood from the following description and drawings.

DETAILED DESCRIPTION OF THE INVENTION

The present invention relates generally to the process determining changes to the setup of electronic devices, and, more specifically, to the determination of change of Subscriber Identity Module (SIM) card in an electronic device connected to a telecommunications network.

Figure 1:
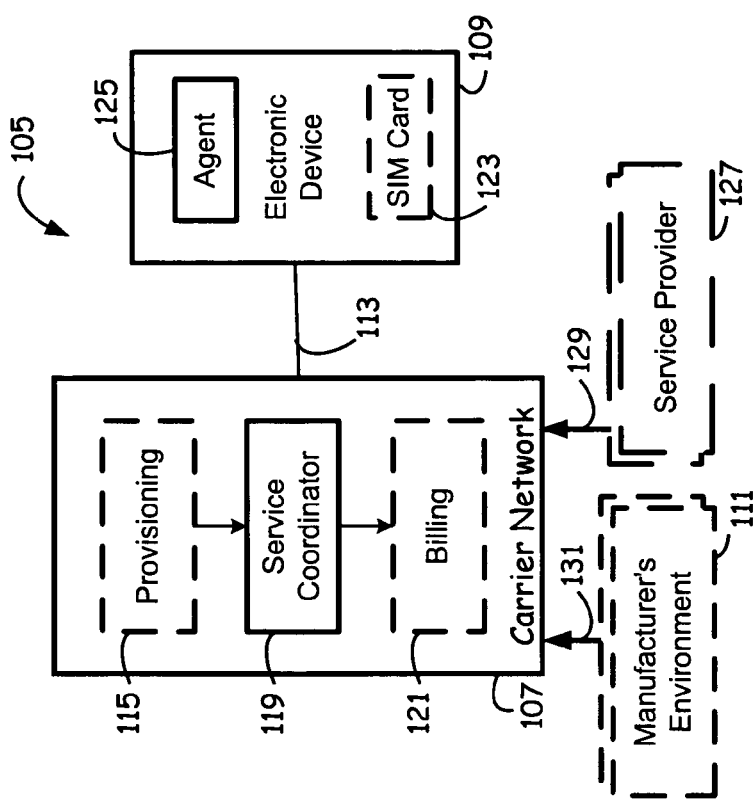
FIG. 1 is perspective block diagram of a communications network capable of determining SIM card changes in electronic devices comprising a carrier network, an optional manufacturer's environment, optional service providers and an electronic device capable of manipulating a SIM card, all communicatively coupled to the carrier network.

FIG. 1 is perspective block diagram of a communications network capable of determining SIM card changes in electronic devices comprising a carrier network 107, an optional manufacturer's environment 111, optional service providers 127 and an electronic device 109 capable of manipulating a SIM card, all communicatively coupled to the carrier network. The electronic device 109 comprises a agent 125 and an optional SIM card 123 and is capable of determining when a SIM card is changed. For example, it is capable of determining if one SIM card 123 is removed and a different SIM card 123 is introduced into the electronic device 109. The carrier network 107, in addition to comprising telecommunications equipment such as switches, routers, etc. and telecommunication software, also comprises a service coordinator 119, an optional provisioning system 115 and an optional billing system 121.

In general, the agent 125 facilitates determination of SIM Card changes in the electronic device 125. It also facilitates the selective reporting of such changes to the carrier network 107. In addition, the determination of changes to information contained in the SIM card 123 can also be detected and acted upon by the electronic device 109.

The agent 125 of the electronic device 109 is capable of determining when a SIM card has changed and reports the event to the service coordinator 119. The agent 125 of the electronic device 109 is also capable of determining the device type in terms of make, model, version numbers (for hardware, software, firmware, etc.) and reporting it to the service provider in conjunction with reports of change in SIM card, when detected.

The service coordinator 119 facilitates interactions of the carrier network 107 with the agent 125 of the electronic device 109, with the manufacturer's environment(s) 111 and with service provider(s) 127. It receives SIM card change reports from agents in a plurality of electronic devices 109 and selectively saves them in its database. When the agent 125 reports a change in SIM card 123 in the electronic device 109, the service coordinator also selectively reports the SIM card change to the service provider 127, the manufacturer's environment 111 and to other systems that need to know about the change.

SIM card changes in the electronic device 109 are typically of two kinds—when a SIM card is initially inserted when the electronic device 123 is new and is being used for the first time, and when a SIM card is replaced by a different SIM card. In both the scenarios, the agent 125 of the electronic device determines the change in SIM card and selectively reports the SIM card change to the service coordinator 119.

If an end-user has a plurality of electronic devices 123 and uses the same SIM card 123 in each of them, then a change of SIM card 123 reported to the service coordinator 119 by the agent 125 of the electronic device 109 implies that the electronic device 109 has changed. In order to continue to provide the end-user with all the services subscribed to by the end-user, as referenced by the SIM card 123 information, despite the change of electronic devices 109, provisioning information, when available, is selectively accessed by the service coordinator 119 from the provisioning system 115. Thus, when the electronic device 109 reports a change in SIM card 123 and the SIM card 123 change is determined to be a change in electronic device 109, the service coordinator can access the provisioning information for the SIM card 123, including all services subscribed to by the end-user, and enable access to all those services via the changed electronic device 123.

In one embodiment, in order to determine a change in electronic device, if any, associated with a change in SIM card, the service coordinator 119 processes the received report of SIM card change provided by the electronic device 109 and looks into its database to determine if there is change of electronic device indicated. If it determines that the electronic device 109 has changed, based on make, model, version information received along with the SIM card change report, it takes action to ensure that the services associated with the SIM card (subscribed by the end-user) continue to be delivered on to the new electronic device, currently associated with the SIM card 123. To ensure that access to services subscribed to by the end-user are not interrupted, the service coordinator 119 coordinates the selective transfer of configuration information, preferences, software updates, device driver changes, firmware updates etc. from the manufacturer's environment 111, the service provider 127 or from its own database.

In another embodiment, the agent 125 of the electronic device 109 determines that the SIM card 123 has changed and reports the SIM card change to the service coordinator 119 over the communication link 113. The communication link 113 is an SMS link or a TCP/IP based link. Other types of communication links are also contemplated. The service coordinator 119 saves the SIM card change information in its database and contacts the provisioning system 115 to access provisioning information and processes it. If it determines that the electronic device associated with the SIM card has changed, then it selectively determines if any service currently subscribed to by the end-user is affected by the change and communicates an appropriate message to the end-user via the electronic device 109. If any action needs to be taken by the end-user as a follow-up to ensure continuation of service (s), the end-user is provided with the appropriate prompts, end-user interactions are facilitated and end-user inputs are processed.

In one embodiment, the communications network 105 facilitates the selective download of software update packages, preferences, configuration information, etc. to the electronic device 109 over the communication link 113, following e report of a change of SIM card at the electronic device 109.

In a different embodiment, the carrier network supports wireless communications and the communications network 105 makes it possible to conduct over-the-air (OTA) updates to firmware and software on the electronic device 109 following a change of SIM card 123 associated with the electronic device 109 or a change of electronic device 109 associated with the SIM card 123.

In general, if billing related information is to be collected for software or firmware packages transferred to the electronic device 109, the billing system 121 is employed by the carrier network 107. In addition to such collected billing information, activity logs are maintained by the carrier network 107 to keep track of the number of software/firmware downloads by the electronic device 109, the status of download attempts, etc.

In one embodiment, the manufacturer's environment 111 is combined with the service provider 127. In another embodiment, both the manufacturer's environment 111 and the service provider 127 is combined with the carrier network 107.

Figure 2:
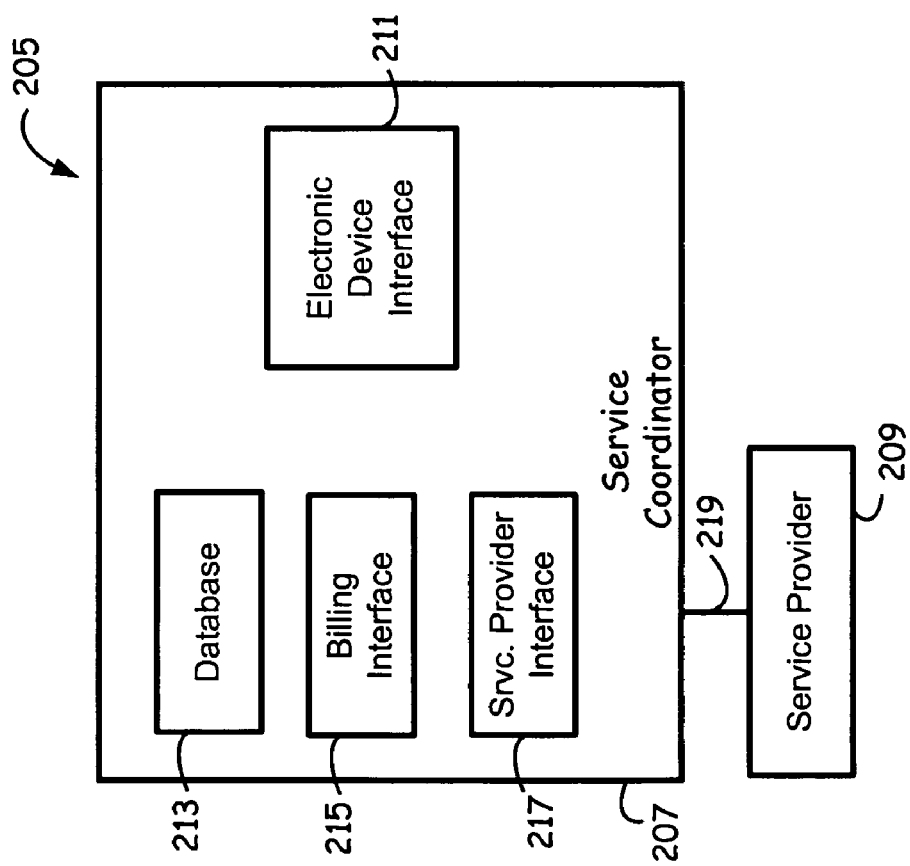
FIG. 2 is perspective block diagram of an exemplary service coordinator that selectively interacts with a service provider in order to communicate information regarding a change of SIM card by the electronic device.

FIG. 2 is perspective block diagram of an exemplary service coordinator 207 that selectively interacts with a service provider 209 in order to communicate information regarding a change of SIM card by the electronic device 109. The service coordinator 207 comprises a database 213, a billing interface 215, a service provider interface 217 and an electronic device interface 211. The electronic device interface is used to communicate with electronic devices over one or more communication links employing appropriate protocols. The billing interface 215 is employed to interact with billing systems to communicate information regarding any service provided to an electronic device by the service provider 209 or by the service coordinator 207. The service provider interface 217 is used to communicate with one or more service providers 209.

In one embodiment, the database 213 contains information about the end-user's SIM cards and electronic device information, such as make, model and version numbers. This information can be used to map a SIM card information to information regarding the electronic device. If a SIM card change is communicated by the electronic device the database is updated. If the electronic device type such as make, model, versions, etc. is also communicated to the service provider by the service coordinator 207, the mapping of SIM card to device type information in the database 213 is also updated. In a related embodiment, the database 213 also contains firmware/software and configuration information for electronic devices and services subscribed to by end-users.

Figure 3:
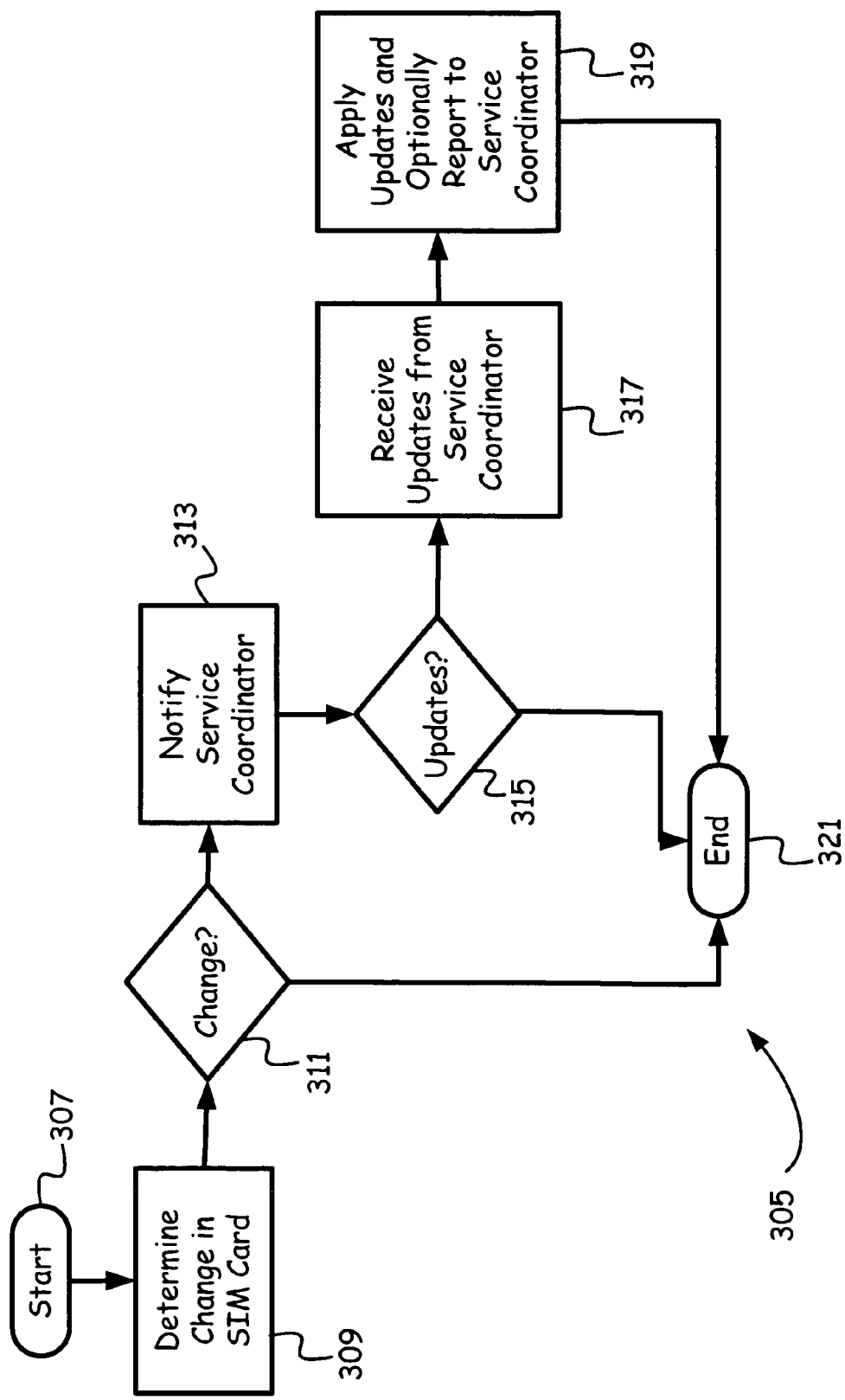
FIG. 3 is a block diagram describing the behavior of the electronic device that contains the agent.

FIG. 3 is a block diagram describing the behavior of the electronic device that contains the agent. At a start block 307, the processing starts, typically when the power in the electronic device is turned on and the agent is invoked. At the next block 309, the agent in the electronic device determines if the SIM card has been changed. In one embodiment, the electronic device stores the SIM card related information such as the issuing entity, the service associated, the identification of the end-user, etc. in non-volatile memory (such as FLASH memory) for subsequent access by the agent, such as during power-up. If a change in SIM card is detected at the next decision block 311, then a notification is sent to the service coordinator at the next block 313, otherwise, the processing ends at the end block 321.

When the notification is sent to the service coordinator at the block 313, the service coordinator may respond with a list of software updates or configuration updates that it may deem necessary. At the next decision box 315, a determination is made if updates are necessary. In one embodiment, the agent makes such determination based upon information available in the electronic device or based on information received from the service coordinator. In another embodiment, the service coordinator makes such determination and communicates it to the agent. If no updates are necessary or available, the process terminates at the end block 321. Otherwise, the agent selectively receives updates from service coordinator at the next block 317. In one embodiment, the end-user is prompted to initiate the communication of updates from the service coordinator. In another embodiment, the updates are automatically downloaded without end-user prompts.

Later, at the next block 319, the updates are selectively applied and the success or failure of the update operations are selectively reported to the service coordinator. Finally, the processing terminates at the end block 321.

Figure 4:
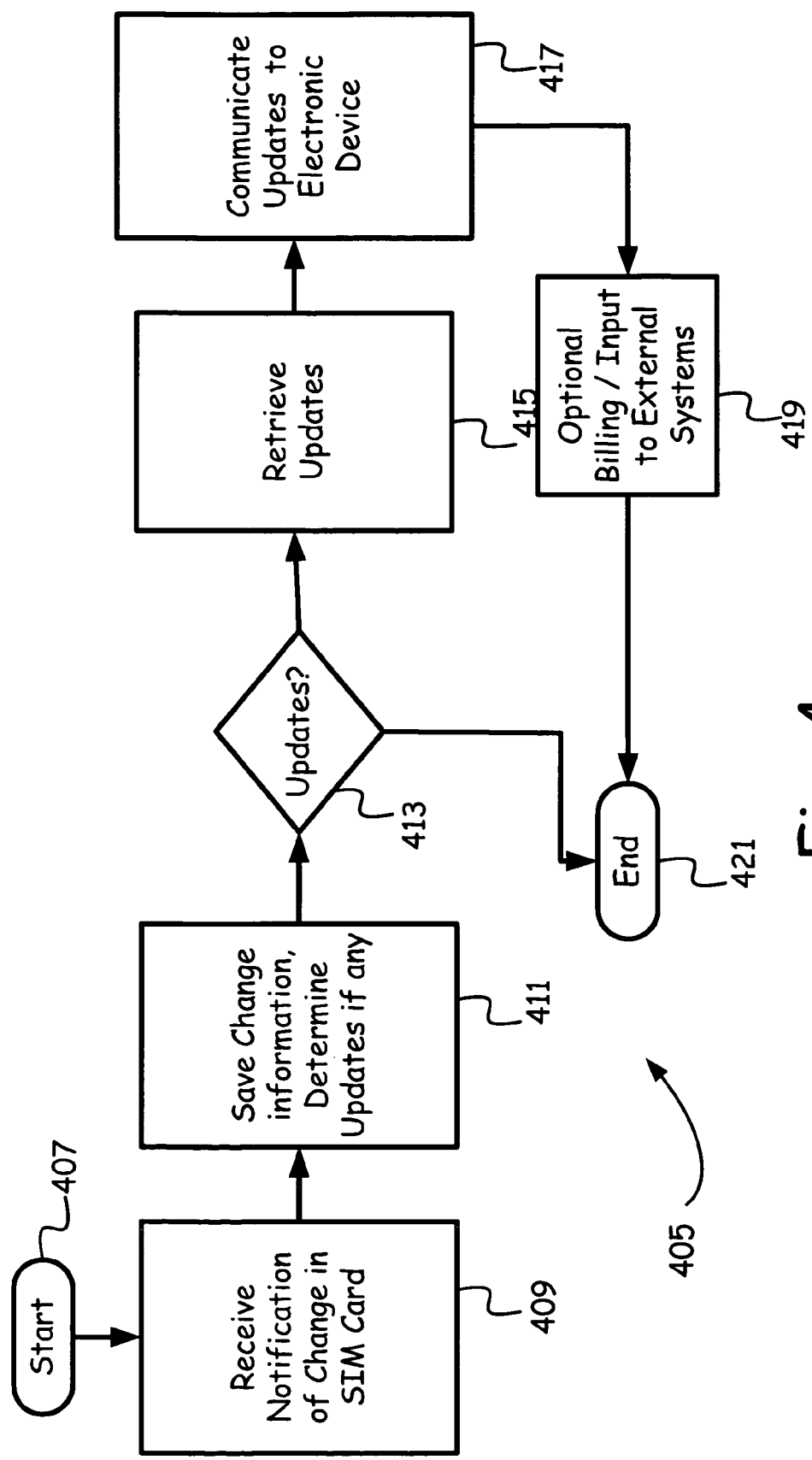
FIG. 4 describes exemplary operation of the service coordinator in response to SIM card change information received from the agent in the electronic device.

FIG. 4 describes exemplary operation of the service coordinator in response to SIM card change information received from the agent in the electronic device. At a block 407, the processing starts. At a next block 409, the service coordinator receives notification from an agent in the electronic device indicating a change in SIM card. At a next block 411, the service coordinator saves the SIM card change information in the database. It then determines if any updates of software/firmware or configuration is necessitated by the SIM card change. If, at a next decision block 413, it is determined that updates are necessary, then updates are retrieved, if available, at a next block 415. Otherwise processing ends at the end block 421.

If updates are retrieved at the block 415 and communicated to the electronic device at the block 417, the agent in the electronic device selectively applies them. In one embodiment, the agent also acknowledges receipt of the updates and selectively acknowledges the successful application of the updates.

Later, any billing related activities are executed at a next block 419 before processing stops at the end block 412. Billing related activities may involve sending billing inputs to external systems or to internal billing systems.

Figure 5:
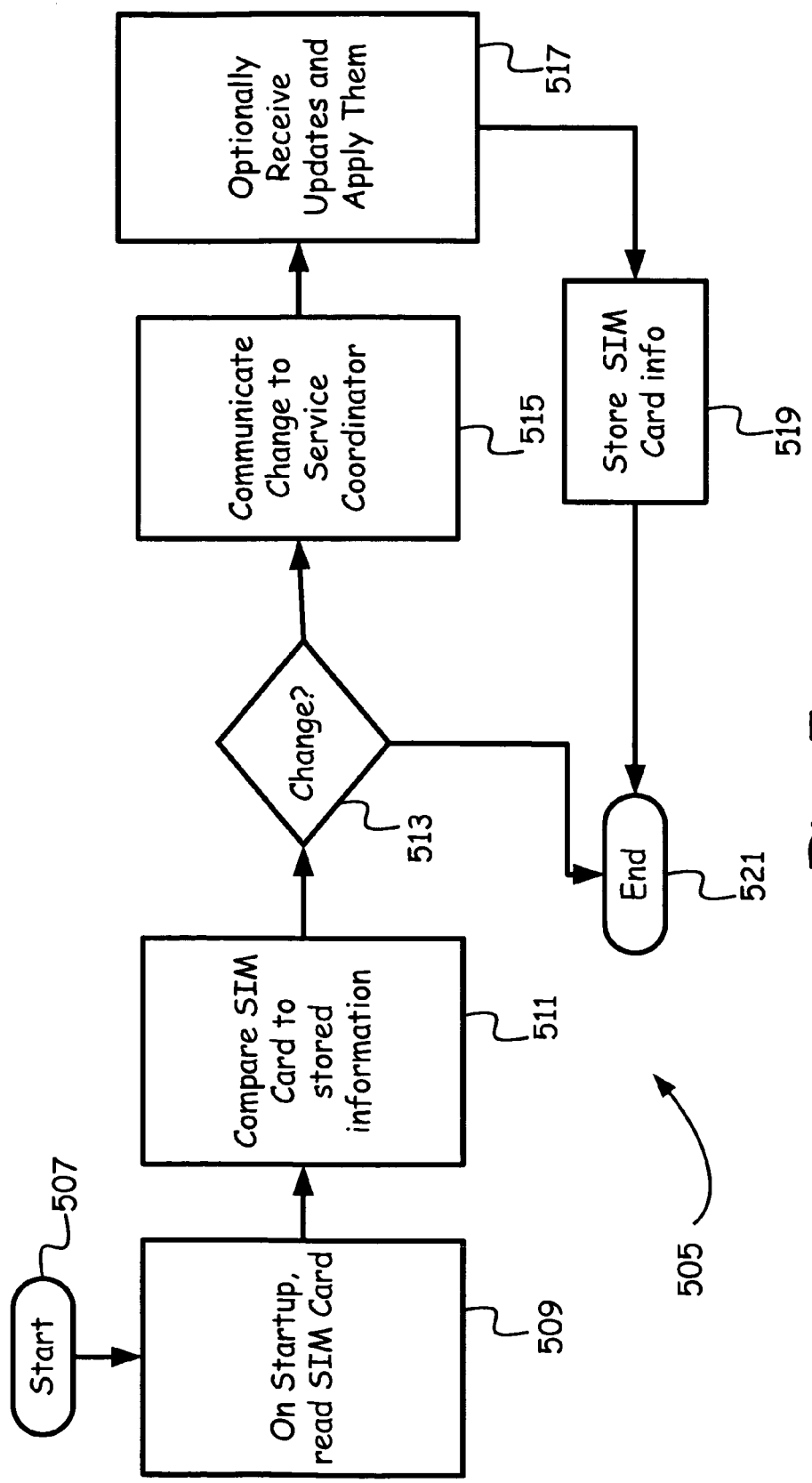
FIG. 5 is an exemplary flow chart for the operation of the agent that describes the process of determining a SIM card change based on SIM card information previously saved in the electronic device.

FIG. 5 is an exemplary flow chart for the operation of the agent that describes the process of determining a SIM card change based on SIM card information previously saved in the electronic device. Processing starts at a block 507 when the electronic device is powered-up. At the next block 509, the agent in the electronic device reads the SIM card information. In one embodiment, the SIM card information includes the end-user's unique identity, the end-user's account number with a carrier or service provider, etc. Information typically available in a SIM card, such as a SIM card for a GSM phone, is also selectively read.

At the next block 511, the SIM card information read from the currently available SIM card is compared to SIM card information stored in non-volatile memory of the electronic device, such information having been previously saved in non-volatile memory. Later, at a next decision block 513, and attempt is made to determine if the SIM card has changed, based on the comparison of information retrieved from the SIM card with that stored in the electronic device.

If it is determined that the SIM card has not changed, then processing terminates at the end block 521.

If, at the decision block 513, it is determined that the SIM card has changed, then, at the next block 515, the SIM card change information is communicated to the service coordinator. Later, at a next block 517, the updates of software, firmware, configuration, etc. optionally communicated by the service coordinator is received, processed and selectively applied. Then, at a next block 519, the SIM card related information and a subset of information retrieved from the changed SIM card is stored in non-volatile memory. Finally, processing terminates at an end block 521.

In yet another embodiment of the present invention, the service coordinator is responsible for and capable of determining if a SIM card changed in an electronic device. In this embodiment, the agent in the electronic device selectively reports SIM card information whenever the electronic device is powered-up or whenever a SIM card related information is manipulated. The service coordinator stores SIM card information and other related information communicated to it by the agent. Whenever it receives SIM card information from the agent, it compares it to the stored information to detect a change in SIM card, if any. If it detects a SIM card change, it then selectively communicates the SIM card change to the manufacturer's environment, to the service provider(s) or to other external systems. It also selectively communicates updates of firmware, software, configuration and/or preferences to the electronic device.

In one embodiment, the service coordinator is located in the manufacturer's environment instead of the carrier network. In another embodiment, the service coordinator is located in the service provider instead of the carrier network. In a different embodiment, the service coordinator is located separately on its own, external to and communicatively coupled to the carrier network, the manufacturer's environment and the service provider(s).

In one generic embodiment, the electronic device has a programmed card reader, which may be a SIM card reader or a smart card reader or other type of card readers. Again, the electronic device has an intelligent agent, which can be an agent that supports selective downloads, uploads, or both, in addition to being able to apply updates of firmware, software, configuration and/or preferences. In one embodiment, the intelligent agent is implemented as a group of agents each responsible for different activities. The intelligent agent typically is capable of detecting a "programmed card changed event", when the programmed card employed by the electronic device is changed. Such a change may occur when a new electronic device is used for the first time and a programmed card is inserted into the programmed card reader of the electronic device, or when an end-user owns multiple electronic devices and shares the same programmed card between them.

In general, device specific information such as the make, model, version numbers of firmware, etc. is communicated to the service provider of the carrier network whenever the programmed card changed event is detected by the intelligent agent.

In one embodiment, the intelligent agent resides in the programmed card, such as a SIM card or a smart card, and helps detect a change in electronic device and generates a device changed event whenever the programmed card is inserted into a different electronic device, which is analogous to a programmed card changed event.

These and other objects of the present invention are achieved in an electronic device with a programmed card reader, the electronic device communicatively coupled to a carrier network and capable of communicating with the carrier network when any authorized programmed card is docked in the programmed card reader, the electronic device comprising an intelligent agent capable of communicating with the carrier network. In one embodiment, the intelligent agent detects the presence of the any authorized programmed card in the programmed card reader of the electronic device. The intelligent agent also detects when the any authorized programmed card is changed and, in response, communicates a programmed card changed event to the carrier network.

In a related embodiment, the intelligent agent determines that the any authorized programmed card that is currently employed in the programmed card reader of the electronic device in a current session is different from the any authorized programmed card employed during a previous session, and, in response, it communicates a programmed card changed event to the carrier network.

In another related embodiment, the electronic device communicates the programmed card changed event to the carrier network in order to initiate the determination of the availability of updates for the electronic device.

Again, in another related embodiment, the electronic device of communicates the programmed card changed event and device type information of the electronic device, wherein the event comprises identification information uniquely identifying the any authorized programmed card that is currently employed in the programmed card reader of the electronic device in the current session.

In yet another related embodiment, the device type information comprises a selective combination of manufacturer, model, hardware version number, firmware version number and/or software version number.

In one embodiment, the electronic device of further comprises a firmware, a software and a first agent component and a second agent component of the intelligent agent. The first agent component communicates the programmed card changed event to the carrier network in order to initiate the determination of the availability of updates for the electronic device. It also receives one or more updates communicated by the carrier network in response to the programmed card changed event communicated by the electronic device. The second agent component of the intelligent agent applies the one or more updates to update or adapt the firmware and/or software in the electronic device.

In one embodiment, the electronic device from further comprises a programmed card in place of the any authorized programmed card that is inserted into the programmed card reader, a non-volatile storage area, and a stored data in the non-volatile storage area that is computed from information retrieved from the any authorized programmed card inserted into the programmed card reader. The intelligent agent is capable of accessing, from the non-volatile storage area, the stored data. It is also capable of reading an input data from the programmed card inserted into the programmed card reader. The intelligent agent reads the input data from the programmed card when the programmed card is inserted into the programmed card reader, compares it to the stored data stored in the non-volatile storage area whenever the programmed card is inserted into the programmed card reader, or whenever the electronic device is powered up, and detects a programmed card changed event only when the stored data does not match the input data. The intelligent agent communicates the programmed card changed event to the carrier network whenever it detects the programmed card changed event.

In another related embodiment, the intelligent agent receives updates communicated by the carrier network in response to the programmed card changed event communicated by the electronic device to the carrier network.

In another related embodiment, the electronic device communicates the programmed card changed event to a service provider via the carrier network, that is communicatively coupled to the carrier network, that responds to the programmed card changed event communicated to it.

In another embodiment, the electronic device of further comprises the intelligent agent capable of assembling or retrieving a device specific information from the electronic device wherein the intelligent agent communicates the device specific information and the input data from the programmed card to the carrier network along with the programmed card changed event.

In another embodiment, the electronic device is capable of interacting with the carrier network that maps the input data from the programmed card to the device specific information communicated by the intelligent agent.

In one embodiment, a carrier network comprises a first electronic device with an intelligent agent communicatively coupled to the carrier network, the first electronic device comprising a programmed card reader and a first programmed card associated with the carrier network or a service provided by the carrier network, a service coordinator that is communicatively coupled to the first electronic device. It also comprises a second electronic device with the intelligent agent and a second programmed card reader also communicatively coupled to the service coordinator. In addition, a first device specification in the first electronic device describes the device specifications of the first electronic device and a second electronic device specification in the second electronic device describes the device specifications of the second electronic device. The intelligent agent in the second electronic device detects the presence of the first programmed card, when the first programmed card is introduced into the second programmed card reader of the second electronic device, and communicates a first programmed card information retrieved from the first programmed card to the service coordinator along with the second electronic device specification.

In a related embodiment, the carrier network of further comprises the service coordinator storing the first programmed card information that it receives from the second electronic device when the first programmed card replaces the second programmed card in the second electronic device and a communication is received from the second electronic device containing the first programmed card information along with the second electronic device specification. The service coordinator determines that a programmed card changed event has occurred and the service coordinator also determines the availability of updates for the second electronic device based on received second electronic device specification. It then communicates the availability of updates to the second electronic device.

In another related embodiment, the carrier network of further comprises the service coordinator receiving the first programmed card information along with the second electronic device specification communicated by the intelligent agent in the second electronic device. The service coordinator maintains a saved mapping information that maps a plurality of known programmed card related information to associated known electronic devices. The service coordinator also detects a programmed card changed event by comparing the received first programmed card information to the saved mapping information. It then associates the first programmed card with the second electronic device specifications and stores an association information as part of the saved mapping information.

In one related embodiment, the carrier network of also comprises an intelligent agent in the second electronic device that detects the presence of the first programmed card and communicates a programmed card changed event to the service coordinator along with the second electronic device specification when the first programmed card is incorporated into the second programmed card reader of the second electronic device replacing the second programmed card. The service coordinator receives the programmed card changed event and the second electronic device specifications communicated by the intelligent agent in the second electronic device and associates the first programmed card information with the second electronic device specification and also creates a mapping that is saved for subsequent retrieval.

In a related embodiment, the carrier network of further comprises services associated with first programmed card information. The service coordinator facilitates delivery of the services associated with the first programmed card information and it also facilitates the continuation of the delivery of services associated with first programmed card information to the second electronic device after the first programmed card is removed from the first electronic device and incorporated into the second electronic device.

In a related embodiment, the carrier network of comprises the service coordinator connectively coupled to an external entity such as a manufacturer's portal environment or a service provider's server. The service coordinator receives the programmed card changed event communicated by the intelligent agent in the second electronic device and sends an associated message to the external entity.

In a related embodiment, the carrier network of further comprises a new service supported by the service coordinator. The service coordinator causes the external entity to selectively send at least one update package associated with the new service to the second electronic device from the external entity via the service coordinator in response to the associated message received by the external entity. The second electronic device becomes a dynamic platform by accepting and installing the at least one update package associated with the new service.

In another related embodiment of the carrier network, the second electronic device further comprises firmware and software wherein the at least one update package sent by the external entity to the second electronic device is an update to the firmware or the software, or both.

In a different embodiment, a mobile handset is communicatively coupled to a cellular wireless network. The mobile handset comprises a subscriber identity module that identifies a subscriber's subscription to the cellular wireless network, the subscriber identity module being mounted in a programmed card, the programmed card capable of being inserted into any mobile handset that will accept the programmed card, the subscriber identity module, when inserted into the mobile handset as part of the programmed card, providing the cellular wireless network information about the subscriber that is necessary for establishing a call, billing, etc., the mobile handset further comprising. The mobile handset also comprises a non-volatile storage, a previous card reference in the non-volatile storage for saving at least a portion of information provided by the subscriber identity module; and a device specification comprising at least a manufacturer, a model, a firmware version of the mobile handset. The mobile handset compares the saved previous card reference to at least a portion of the information provided by the current subscriber identity module, on powerup or on insertion of the programmed card containing the subscriber identity module into the mobile handset, and, if determined to be different, the mobile handset saves at least a portion of the information provided by the subscriber identity module in the previous card reference. In addition, the mobile handset communicates a subscriber identity module changed event to the cellular wireless network when it determines that the saved previous card reference does not match the at least a portion of the information provided by the current subscriber identity module.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and appended diagrams.

What is claimed is:

1. A handheld electronic device comprising:
   at least one processor operably coupled to circuitry for communicating over a wireless network and to at least one memory having stored therein executable code supporting a set of services on the handheld electronic device, the at least one processor operable to, at least,
   detect a user interchangeable programmed card operably coupled to the at least one processor, send, to a first remote server over the wireless network based upon the detection, an indication of a user interchangeable programmed card change event, and information identifying the handheld electronic device and at least one subscription service, and receive, automatically, from a second remote server over the wireless network, one of information for updating the at least one memory in the handheld electronic device to enable user access to the at least one subscription service, and information for notifying a user of availability of the at least one subscription service, wherein the information for updating the at least one memory is sent to the handheld electronic device without the sending being initiated by the user, if it is determined that one or more of the following: device configuration information, user preferences, and software or firmware of the electronic device, is not able to support providing the identified at least one subscription service to a user.

2. The handheld electronic device according to claim 1, wherein the user interchangeable programmed card is of a size suitable for insertion into the handheld electronic device.

3. The handheld electronic device according to claim 2, wherein the user interchangeable programmed card comprises a subscriber identity module (SIM) card.

4. The handheld electronic device according to claim 1, wherein the at least one processor is further operable as part of the detecting to, at least:
determine that a user interchangeable programmed card change event has occurred, if the operably coupled user interchangeable programmed card has not previously been operably coupled to the at least one processor.

5. The handheld electronic device according to claim 1, wherein the at least one processor is further operable as part of the detecting to, at least:
determine that a user interchangeable programmed card change event has occurred, if the user interchangeable programmed card operably coupled to the at least one processor is a different user interchangeable programmed card from a previously operably coupled user interchangeable programmed card.

6. The handheld electronic device according to claim 1, wherein the at least one processor is further operable to, at least:
process the information for updating the at least one memory to enable use of the handheld electronic device with the at least one subscription service.

7. The handheld electronic device according to claim 1, wherein detecting operable coupling of the user interchangeable programmed card comprises accessing contents of the user interchangeable programmed card.

8. The handheld electronic device according to claim 1, wherein the handheld electronic device comprises one of the following: a cellular telephone, and a personal digital assistant (PDA).

9. The handheld electronic device according to claim 1, wherein the wireless network comprises a wireless cellular telephone network.

10. The handheld electronic device according to claim 1, wherein the first remote server and the second remote server are the same server.

11. The handheld electronic device according to claim 1, wherein the handheld electronic device prompts the user regarding a service subscription in response to receipt of the information for notifying a user of availability of the at least one subscription service.

12. The handheld electronic device according to claim 1, wherein the at least one processor is further operable to, at least:
determine version information for executable code supporting a set of services on the handheld electronic device.

13. The handheld electronic device according to claim 1, wherein the at least one memory comprises non-volatile memory.

14. The handheld electronic device according to claim 13, wherein the non-volatile memory comprises flash memory.

15. A system supporting delivery of subscription services to users of a plurality of handheld electronic devices each enabled to operably couple to a user interchangeable programmed card, the system comprising:
at least one server communicatively coupled to at least one of the plurality of handheld electronic devices via a wireless network, wherein the at least one server receives from the one of the plurality of handheld electronic devices an indication of a user interchangeable programmed card change event, and information identifying the at least one of the plurality of handheld electronic devices and at least one subscription service;
wherein the at least one server sends to the at least one of the plurality of handheld electronic devices, via the wireless network in response to the user interchangeable programmed card change event, one of information for updating at least one memory in the at least one of the plurality of handheld electronic devices to enable user access to the at least one subscription service, and information for notifying a user of availability of the at least one subscription service;
where the at least one server determines whether the at least one of the plurality of handheld electronic devices is able to support providing the identified at least one subscription service to a user; and
wherein the at least one server automatically sends the information for updating the at least one memory in the at least one of the plurality of handheld electronic devices, if it is determined that one or more of the following: device configuration information, user preferences, and software or firmware of the at least one of the plurality of electronic devices, is not able to support providing the identified at least one subscription service to the user.

16. The system according to claim 15, wherein the at least one of the plurality of handheld electronic devices wirelessly communicates the indication of a user interchangeable programmed card change event, and the information identifying the handheld electronic device and at least one subscription service, to the at least one server, over a transport control protocol (TCP)/Internet protocol (IP) based link.

17. The system according to claim 15, wherein at least one of the plurality of handheld electronic devices wirelessly communicates the indication of a user interchangeable programmed card change event, and the information identifying the handheld electronic device and at least one subscription service, to the at least one server, over a short message service (SMS) based link.

18. The system according to claim 15, wherein the user interchangeable programmed card is of a size suitable for insertion into the handheld electronic device.

19. The system according to claim 15, wherein the user interchangeable programmed card comprises a subscriber identity module (SIM) card.

20. The system according to claim 15, wherein the indication of a user interchangeable programmed card change event comprises information identifying one of the following: a manufacturer, a model, a version of hardware, a version of software, and a version of firmware, for the one of the plurality of handheld electronic devices.

21. The system according to claim 15, wherein the at least one server maintains a database comprising entries associating handheld electronic devices with user interchangeable programmed cards.

22. The system according to claim 15, wherein the at least one server has stored thereon the information for updating the at least one memory in the at least one of the plurality of handheld electronic devices.

23. The system according to claim 15, wherein the at least one server retrieves from a source outside of the system, the information for updating the at least one memory in the at least one of the plurality of handheld electronic devices.

24. The system according to claim 15, wherein the at least one server automatically sends the information for notifying a user of availability of the at least one subscription service, if it is determined that one or more of the following: device configuration information, user preferences, and software or firmware, of the at least one of the plurality of electronic devices, is able to support a subscription service not identified in the received indication of a user interchangeable programmed card change event.

25. The system according to claim 15, wherein the information for updating the at least one memory in the at least one of the plurality of handheld electronic devices comprises one of the following: device configuration information, user preferences, and information for updating software or firmware.

26. The system according to claim 15, wherein the plurality of handheld electronic devices comprises one of the following: a cellular telephone, and a personal digital assistant (PDA).

27. The system according to claim 15, wherein the wireless network comprises a wireless cellular telephone network.

28. A handheld electronic device comprising:
at least one processor operably coupled to circuitry for communicating over a wireless network and to at least one memory having stored therein executable code supporting a set of services on the handheld electronic device, the at least one processor operable to, at least,
detect a user interchangeable programmed card operably coupled to the at least one processor,
send, to a first remote server over the wireless network based upon the detection, an indication of a user interchangeable programmed card change event, and information identifying the handheld electronic device and at least one subscription service, and
receive, from a second remote server over the wireless network, one of information for updating the at least one memory in the handheld electronic device to enable user access to the at least one subscription service, and information for notifying a user of availability of the at least one subscription service, wherein the information for updating the at least one memory is automatically sent to the handheld electronic device, if it is determined that one or more of the following: device configuration information, user preferences, and software or firmware of the electronic device, is not able to support providing the identified at least one subscription service to a user.

* * * * *